(12) United States Patent
Chang (10) Patent No.: US 11,683,557 B2
(45) Date of Patent: Jun. 20, 2023

(54) METHOD FOR PLAYING MP4 ONLINE, DEVICE, AND STORAGE MEDIUM

(71) Applicant: Beijing Baidu Netcom Science Technology Co., Ltd., Beijing (CN)

(72) Inventor: Yanlong Chang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/574,819

(22) Filed: Jan. 13, 2022

(65) Prior Publication Data
US 2022/0141519 A1 May 5, 2022

(30) Foreign Application Priority Data
Jun. 21, 2021 (CN) .......................... 202110683776.8

(51) Int. Cl.
*H04N 21/435* (2011.01)
*H04L 67/02* (2022.01)
(Continued)

(52) U.S. Cl.
CPC ........... *H04N 21/435* (2013.01); *H04L 67/02* (2013.01); *H04N 21/437* (2013.01); *H04N 21/44209* (2013.01); *H04N 21/85406* (2013.01)

(58) Field of Classification Search
CPC ............... H04N 21/435; H04N 21/437; H04N 21/44209; H04N 21/85406; H04N 21/462; H04N 21/845; H04N 21/44008; H04N 21/23605; H04N 21/2343; H04N 21/23614; H04N 21/2368; H04L 67/02;
(Continued)

(56) References Cited

U.S. PATENT DOCUMENTS

2009/0319679 A1* 12/2009 Okada .................... G06F 15/16
2011/0093617 A1 4/2011 Igarashi
(Continued)

FOREIGN PATENT DOCUMENTS

CN 102088449 A 6/2011
CN 102169706 A 8/2011
(Continued)

OTHER PUBLICATIONS

European Patent Office; Extended European Search Report for Application No. 22150896.3, dated Jul. 26, 2022 (8 pages).

*Primary Examiner* — Anthony Bantamoi
(74) *Attorney, Agent, or Firm* — Ice Miller LLP; Justin Swindells (57) ABSTRACT

The present disclosure provides a method for playing an MP4 online, an electronic device, and a computer readable storage medium. The present disclosure relates to the technical fields of artificial intelligence, and further relates to the technical fields of media cloud. A specific embodiment of the method includes: acquiring a total size of a target MP4 file, and determining a target data length based on the total size and a preset proportion, where the preset proportion is determined based on a proportion of MOOV data to a complete MP4 file; acquiring header data having the target data length from a header of the MP4 file, and acquiring trailer data having the target data length from a trailer of the MP4 file; and playing the target MP4 file online based on actual MOOV data extracted from the header data or the trailer data.

18 Claims, 4 Drawing Sheets

(51) Int. Cl.
*H04N 21/437* (2011.01)
*H04N 21/442* (2011.01)
*H04N 21/854* (2011.01)

(58) Field of Classification Search
CPC ....... H04L 65/612; H04L 65/65; H04L 65/70;
H04L 65/40; H04L 65/75
See application file for complete search history.

(56) References Cited

U.S. PATENT DOCUMENTS

| | | |
|---|---|---|
| 2012/0054370 A1 | 3/2012 | Tsubakihara |
| 2016/0155470 A1 | 6/2016 | Toma et al. |
| 2020/0413159 A1 | 12/2020 | Yin |

FOREIGN PATENT DOCUMENTS

| | | |
|---|---|---|
| CN | 102420840 A | 4/2012 |
| CN | 103079091 A | 5/2013 |
| CN | 104363511 A | 2/2015 |
| CN | 105578276 A | 5/2016 |
| CN | 105611395 A | 5/2016 |
| CN | 106162311 A | 11/2016 |
| CN | 110545479 A | 12/2019 |
| EP | 3096533 A1 | 11/2016 |
| EP | 3713243 A1 | 9/2020 |
| JP | 2006-323678 A | 11/2006 |
| JP | 2007060001 A | 3/2007 |
| JP | 2011-087103 A | 4/2011 |
| JP | 2012-054788 A | 3/2012 |
| WO | 2014-073202 A1 | 5/2014 |

\* cited by examiner

METHOD FOR PLAYING MP4 ONLINE, DEVICE, AND STORAGE MEDIUM

CROSS-REFERENCE TO RELATED APPLICATIONS

The present application claims the priority of Chinese Patent Application No. 202110683776.8, titled "METHOD AND APPARATUS FOR PLAYING MP4 ONLINE, DEVICE, STORAGE MEDIUM, AND PROGRAM PRODUCT", filed on Jun. 21, 2021, the content of which is incorporated herein by reference in its entirety.

TECHNICAL FIELD

The present disclosure relates to the technical fields of data processing, specifically relates to the technical fields of artificial intelligence, further relates to the technical fields of media cloud, and more specifically relates to a method for playing an MP4 online, an electronic device, and a computer readable storage medium.

BACKGROUND

The MP4 file format, also known as MPEG-4 Part 14 originates from Part 14 of MPEG-4 standard, and is a multimedia format container widely used for packaging video and audio data streams, posters, subtitles, metadata, or the like.

An MP4 file is composed of different Boxes, mainly including: a version for describing a file, FTYP of a compatible protocol, MOOV for recording macroscopic description information of all media data in this file and specific information of each media track, MDAT for storing specific media data, and some other alternative Boxes.

SUMMARY

Embodiments of the present disclosure propose a method for playing an MP4 online an electronic device, and a computer readable storage medium.

In a first aspect, an embodiment of the present disclosure proposes a method for playing an MP4 online, including: acquiring a total size of a target MP4 file, and determining a target data length based on the total size and a preset proportion, where the preset proportion is determined based on a proportion of MOOV data to a complete MP4 file; acquiring header data having the target data length from a header of the target MP4 file, and acquiring trailer data having the target data length from a trailer of the target MP4 file; and playing the target MP4 file online based on actual MOOV data extracted from the header data or the trailer data.

In a second aspect, an embodiment of the present disclosure provides an electronic device, including: at least one processor; and a memory communicatively connected to the at least one processor; where the memory stores instructions executable by the at least one processor, and the instructions, when executed by the at least one processor, cause the at least one processor to execute the method for playing an MP4 online according to any one implementation in the first aspect.

In a third aspect, an embodiment of the present disclosure provides a non-transitory computer readable storage medium storing computer instructions, where the computer instructions are used for causing a computer to implement the method for playing an MP4 online according to any one implementation in the first aspect.

It should be understood that contents described in the SUMMARY are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described here without departing from the scope and spirit of the present disclosure. Similarly, for clearness and conciseness, descriptions of well-known functions and structures are omitted in the following description. It should be noted that some embodiments in the present disclosure and some features in the embodiments may be combined with each other on a non-conflict basis.

In the technical solutions of the present disclosure, the acquisition, storage, and application of involved user personal information are in conformity with relevant laws and regulations, and do not violate public order and good customs because of adopting necessary security measures.

The method for playing an MP4 online provided in embodiments of the present disclosure first acquires a total size of a target MP4 file, and determines a target data length based on the total size and a preset proportion, where the preset proportion is determined based on a proportion of MOOV data to a complete MP4 file; then acquires header data having the target data length from a header of the target MP4 file, and acquiring trailer data having the target data length from a trailer of the target MP4 file; and finally plays the target MP4 file online based on actual MOOV data extracted from the header data or the trailer data.

This method determines the preset proportion based on a usual proportion of the MOOV data to the complete MP4 file, and targetedly extracts a portion of data having the corresponding data length from the header of the target MP4 file and extracts a portion of data having the corresponding data length from the trailer of the target MP4, thereby quickly starting to play the target MP4 file online without acquiring complete data of the target MP4, even if MOOV data of the target MP4 file is located behind the MDAT data.

Figure 1:
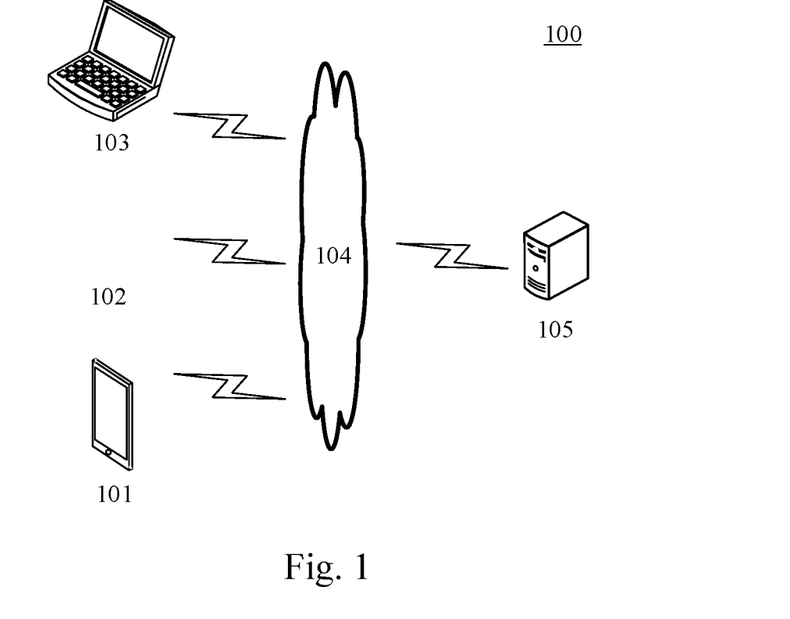
FIG. 1 is an example system architecture in which embodiments of the present disclosure may be implemented.

FIG. 1 shows an example system architecture 100 in which a method for playing an MP4 online, an apparatus for playing an MP4 online, an electronic device, and a computer readable storage medium of embodiments of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, to receive or send a message. The terminal devices 101, 102, and 103 and the server 105 may be provided with various applications for implementing information communication between the terminal devices and the server, such as a video playback application, an online shopping application, and an instant messaging application.

The terminal devices 101, 102, and 103 and the server 105 may be hardware, or may be software. When the terminal devices 101, 102, and 103 are hardware, the terminal devices may be various electronic devices having display screens, including but not limited to a smart phone, a tablet computer, a laptop portable computer, a desktop computer, or the like. When the terminal devices 101, 102, and 103 are software, the terminal devices may be installed in the electronic devices, and may be implemented as a plurality of software programs or software modules, or as a single software program or software module. This is not specifically limited here. When the server 105 is hardware, the server may be implemented as a distributed server cluster composed of a plurality of servers, or may be implemented as a single server. When the server is software, the server may be implemented as a plurality of software programs or software modules, or may be implemented as a single software program or software module. This is not specifically limited here.

The terminal devices 101, 102, and 103 may provide various services through various built-in applications. Taking a video playback application capable of providing online video playback services as an example, and when running the video playback application, the terminal devices 101, 102, and 103 may achieve the following effects: first receiving an instruction for selecting a target MP4 file inputted by a user; then initiating an online playback request for the target MP4 file to the server 105 based on the instruction; then determining a total size of the target MP4 file based on a response message returned by the server 105, and determining a target data length based on the total size and a preset proportion, where the preset proportion is determined based on a proportion of MOOV data to a complete MP4 file; then acquiring header data having the target data length from a header of the target MP4 file, and acquiring trailer data having the target data length from a trailer of the target MP4 file; and finally playing the target MP4 file online based on actual MOOV data extracted from the header data or the trailer data.

The method for playing an MP4 online provided in subsequent embodiments of the present disclosure is generally executed by the terminal devices 101, 102, and 103 controlled by the user. Accordingly, the apparatus for playing an MP4 online is generally provided in the terminal devices 101, 102, and 103.

It should be understood that the numbers of terminal devices, network, and server in FIG. 1 are merely illustrative. Any number of terminal devices, networks, and servers may be provided based on actual requirements.

Figure 2:
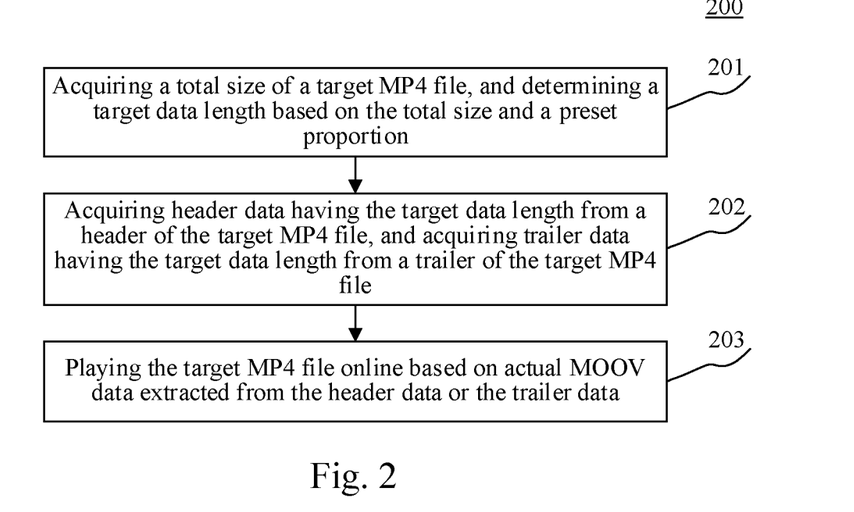
FIG. 2 is a flowchart of a method for playing an MP4 online provided in an embodiment of the present disclosure.

Referring to FIG. 2, FIG. 2 is a flowchart of a method for playing an MP4 online provided in an embodiment of the present disclosure, where the process 200 includes the following steps:

Step 201: acquiring a total size of a target MP4 file, and determining a target data length based on the total size and a preset proportion.

This step is intended to first acquire the total size of the target MP4 file, and then, on this basis, determine a data length (i.e., the target data length) of actual MOOV data in the target MP4 file based on a usual proportion of MOOV data to a complete MP4 file by an executing body (for example, the terminal devices 101, 102, and 103 shown in FIG. 1) of the method for playing an MP4 online.

That is, under normal circumstances, a ratio of a MOOV data size to a complete data size in an MP4 file is the preset proportion, which may be flexibly determined by performing statistics on a large number of sample MP4 files and combining actual needs.

For ease of understanding, an example is provided here:

Assuming that it is found based on a lot of statistical analysis that a MOOV data size in an MP4 file usually accounts for 5% of the total size, and then when the total size of the target MP4 file is 100 MB, the minimum target extraction length may be 100×5%=5 MB.

It should be understood that unless an actual storage location (a header address or a trailer location) of the MOOV data in the target MP4 file is clearly known, the MOOV data can be directly and accurately extracted from the target MP4 file by using only the minimum target extraction length. However, in most cases, it is impossible to know an actual storage location of MOOV data in an MP4 file in advance. Therefore, in order to increase the possibility that extracted partial data includes MOOV data, it is usually necessary to appropriately increase the proportion based on the preset proportion, and the adjustment range and adjustment approach may be flexibly selected based on the actual situation, which will be discussed in detail in subsequent embodiments.

Step 202: acquiring header data having the target data length from a header of the target MP4 file, and acquiring trailer data having the target data length from a trailer of the target MP4 file.

On the basis of step 201, this step is intended to acquire the header data having the target data length from the header of the target MP4 file and acquire the trailer data having the target data length from the trailer of the target MP4 file by the executing body.

It should be understood that the reason why the partial data having the target data length is extracted from only the header and the trailer of the target MP4 file is that the vast majority of a total size of an MP4 file is specific media data, i.e., data stored in the MDAT Box. The FTYP box must be located at a header of the MP4 file, and has a very small data size. Therefore, the MOOV data can only be stored in two ways: one is that the MOOV data is stored in the sequential order of FTYP, MOOV, and MDAT, which is equivalent to the MOOV data being located at the header of the MP4 file; and the other is that the MOOV data is stored in the sequential order of FTYP, MDAT, and MOOV, which is equivalent to the MOOV data being located at the trailer of the MP4 file. There are no other situations.

Therefore, at most it is only necessary to extract partial data having the target data length from the header and the trailer of the target MP4 file, thereby guaranteeing that the actual MOOV data must be included in the extracted partial data.

Step 203: playing the target MP4 file online based on actual MOOV data extracted from the header data or the trailer data.

On the basis of step 202, this step is intended to extract the actual MOOV data by the executing body from the header data or the trailer data, thereby achieving the effects of quickly starting to normally play partial media data of the target MP4 file based on the actual MOOV data, in the case where all media data of the target MP4 file are not received.

The method for playing an MP4 online provided in an embodiment of the present disclosure determines a preset proportion based on a usual proportion of MOOV data to a complete MP4 file, and targetedly extracts a portion of data having a corresponding data length from a header of a target MP4 file and extracts a portion of data having the corresponding data length from a trailer of the target MP4, thereby quickly starting to play the target MP4 file online without acquiring complete data of the target MP4, even if MOOV data of the target MP4 file is located behind the MDAT data.

Figure 3:
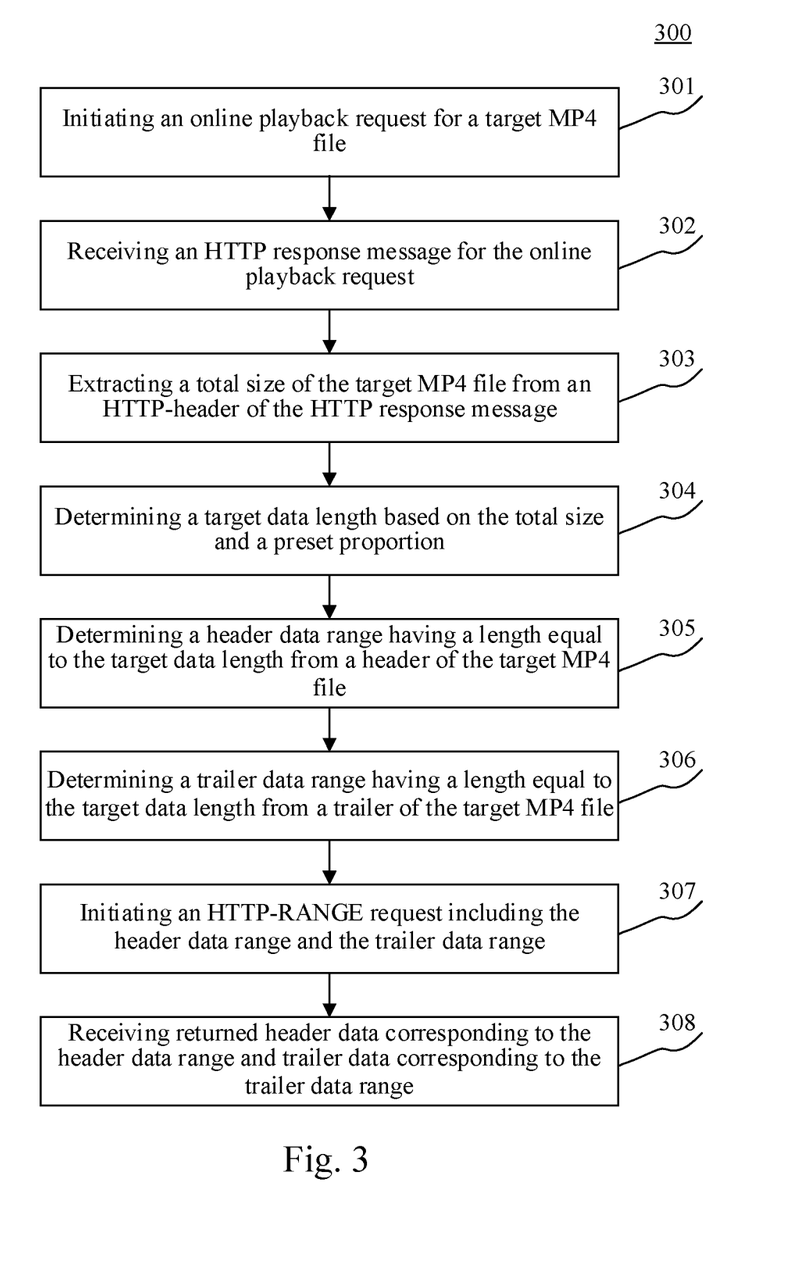
FIG. 3 is another flowchart of the method for playing an MP4 online provided in an embodiment of the present disclosure.

Referring to FIG. 3, FIG. 3 is another flowchart of the method for playing an MP4 online provided in an embodiment of the present disclosure, where the process 300 includes the following steps:

Step 301: initiating an online playback request for a target MP4 file.

The executing body initiates the online playback request for the target MP4 file to a server (for example, the server 105 shown in FIG. 1) storing the target MP4 file. The online playback request is usually generated and transmitted to the server following an HTTP protocol, and subsequent steps are also described, e.g., following the HTTP protocol. The same applies to other protocols with identical or similar functions, which will not be repeated one by one here.

Step 302: receiving an HTTP response message for the online playback request.

On the basis of step 301, this step is intended to receive, by the executing body, the HTTP response message returned by the server for the online playback request received by the server. In the present embodiment, the HTTP response message is not required to include media data of the target MP4 file, but is required to at least include a total size of the target MP4 file for use in the subsequent steps. Since the media data is not required to be included, the time for data transmission is extremely short.

Step 303: extracting a total size of the target MP4 file from an HTTP-header of the HTTP response message.

On the basis of step 302, this step is intended to extract the total size of the target MP4 file by the executing body from the HTTP-header of the HTTP response message. a parameter of the total size is usually fixedly present in a specific field of the HTTP-Header, such that data stored in the field may be directly found based on a default offset address of the field, so as to improve the extraction speed.

Step 304: determining a target data length based on the total size and a preset proportion.

On the basis of step 303, this step is intended to determine the target data length by the executing body based on the total size and the preset proportion.

Step 305: determining a header data range having a length equal to the target data length from a header of the target MP4 file.

Still taking the parameter of the above example as an example, assuming that the target data length is 6 MB, the header data range is the first 6 MB of the target MP4 file from the beginning, and is expressed in bytes from: 0 to 6291456 (bytes/B).

Step 306: determining a trailer data range having a length equal to the target data length from a trailer of the target MP4 file.

Still taking the parameter of the above example as an example, assuming that the target data length is 6 MB, the trailer data is the last 6 MB of the target MP4 file from the end to the beginning, and is expressed in bytes from: 98566144 to 104857600 (bytes/B).

Step 307: initiating an HTTP-RANGE request including the header data range and the trailer data range.

On the basis of step 305 and step 306, this step is intended to request partial data in a corresponding data range by the executing body from the server through an HTTP-RANGE operation, rather than directly requesting for sequentially returning segments or complete data of the MP4 file.

Due to format requirements of an HTTP-RANGE instruction, taking the above example as an example, the initiated HTTP-RANGE request should be specifically:

Range: bytes=0 to 6291456; Range: bytes=98566144 to 104857600.

Step 308: receiving returned header data corresponding to the header data range and trailer data corresponding to the trailer data range.

On the basis of the previous embodiment, the present embodiment provides a specific method for acquiring a total size of a target MP4 file through step 301 to step 303, the speed of data interaction may be improved as far as possible by requesting a server to only return a small amount of data including at least the total size of the target MP4 file for an online playback request; and the present embodiment further provides a specific implementation for partially acquiring partial data at a specific location of the target MP4 file based on an HTTP-RANGE operation through step 305 to step 308.

It should be understood that there is no dependence or causality between the specific implementation provided in step 301 to step 303 and the specific implementation provided in step 305 to step 308, the two specific implementations may be separately combined with the embodiment as shown in the process 200, to obtain different embodiments by replacing a generic implementation in the process 200, and the present embodiment only serves as a preferred embodiment that includes both of the two specific implementations.

Figure 4:
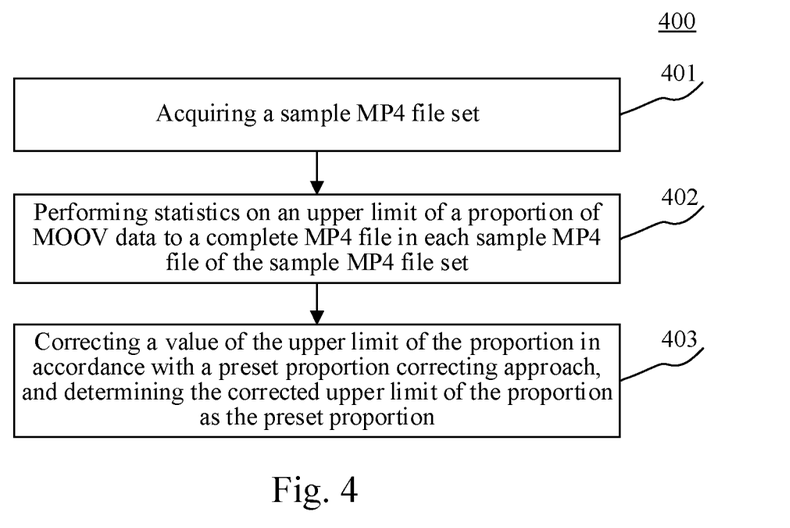
FIG. 4 is a flowchart of a method for determining a preset proportion provided in an embodiment of the present disclosure.

As can be seen from any of the above embodiments, how to determine an appropriate preset proportion is the key to affecting the effectiveness and practicability of the entire scheme. Therefore, the present disclosure specifically provides an implementation of determining the preset proportion here. Referring to the process 400 shown in FIG. 4, the process 400 includes the following steps:

Step 401: acquiring a sample MP4 file set.

Step 402: performing statistics on an upper limit of a proportion of MOOV data to a complete MP4 file in each sample MP4 file of the sample MP4 file set.

The upper limit of the proportion is selected because the upper limit of the proportion can obviously cover more data content than a lower limit of the proportion, and then enhance the possibility of extracting actual MOOV data as far as possible based on the preset proportion determined here when the actual storage location is unknown.

Step 403: correcting a value of the upper limit of the proportion in accordance with a preset proportion correcting approach, and determining the corrected upper limit of the proportion as the preset proportion.

The upper limit of the proportion only represents a proportion of the MOOV to the total size of the complete MP4. In practice, it is also necessary to consider data sizes of other boxes located at the header or the trailer. Therefore, this step corrects the value of the upper limit of the proportion by presetting some correcting approaches (In most cases, the value of the upper limit of the proportion is upwardly corrected, i.e., increased. For example, when the upper limit of the proportion is 4%, it is upwardly corrected to 7%), so as to finally determine the corrected upper limit of the proportion as the preset proportion.

The correcting approaches may include a plurality of correcting approaches. For example, the value of the upper limit of the proportion is corrected based on an idle network bandwidth in an environment, where a size of the idle network bandwidth is directly proportional to an increased value of the upper limit of the proportion, i.e., the larger the idle network bandwidth is, the greater the amount of data that can be acquired per unit time is. Therefore, in order to enhance the ability to extract the complete MOOV data from the partial data at one time, the increased value of the upper limit of the proportion should be great, which corresponding to fully utilizing the idle bandwidth. Alternatively, the value of the upper limit of the proportion may be corrected based on a device type of a present device, where the device type includes a wired communication device and a wireless communication device. An increased value corresponding to the wired communication device is greater than an increased value corresponding to the wireless communication device, and it is because compared with the wireless communication device using wireless communication, the wired communication device using wired communication is more stable and a relatively faster speed, and the above is equivalent to communication situations in which different communication modes are fully utilized.

In addition, a special situation is further involved, i.e., the upper limit of the proportion is downwardly corrected based on a range of an actual size of the target MP4 file exceeding an average size of the sample MP4 files, where the upper limit of the proportion is calculated based on these sample MP4 files. It is because with the increase of the size of the MP4 file, the increase range of the data size of the MOOV data cannot keep up with a specific increase range of the media data. For example, the media data is increased by 1 GB, but the MOOV data is only increased by 1 M. Therefore, this situation is mainly applicable for a very large-in-size MP4 file, so that the time consumption for acquiring the partial data can be reduced as far as possible through the downward correction, and the starting speed of playing the file can be enhanced. A specific implementation includes:

performing statistics to obtain an average size of the sample MP4 files in the sample MP4 file set;

calculating a size difference between a total size of the target MP4 file and the average size; and determining, in response to the size difference indicating that the total size is greater than the average size, a decreased value of the upper limit of the proportion based on a size of the size difference.

Further, on the basis of extracting the actual MOOV data from the header data or the trailer data according to the solution provided in any of the above embodiments, a mark may be attached to the target MP4 file, and the mark is used for declaring an actual location of the actual MOOV data in the MP4 file, so that when an online playback request for the same MP4 file is re-initiated subsequently, there is no need to retry to locate the actual location of the actual MOOV data in the MP4 file again, and thus the whole starting speed of playing the file online may be further improved. Specifically, the mark may be directly attached to a data storage server, or stored locally in a client initiating the target MP4 file. For example, an empty file (i.e., the actual size is 0) with the file name of the target MP4 file is created locally in the client, and then the mark is attached to the empty file, to achieve the same effects.

Further, if it is found based on the solutions provided in the above embodiments that actual MOOV of some MP4 files is stored behind the MDAT, i.e., the MOOV data is located at the trailers of the MP4 files, the MOOV data may be adjusted to be located before the MDAT by a location adjusting operation when there are fewer access requests. Of course, relevant playback operations should be adjusted synchronously to adapt to the new MP4 file after the location of the MOOV data is changed.

Figure 5:
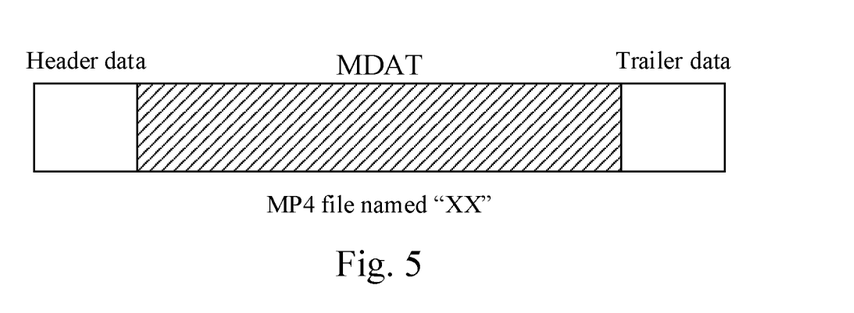
FIG. 5 is a schematic diagram of a data structure of an MP4 file named "XX" provided in an embodiment of the present disclosure.

In order to deepen understanding, the present disclosure further provides a specific implementation process in conjunction with a schematic structural diagram of an MP4 file named "XX" as shown in FIG. 5:

1) a user requests for playback of the MP4 file named "XX" through an online video playback application on a smart phone;

2) the smart phone sends a request for online video playback to a backend server corresponding to the application based on an operation of the request for playback;

3) in response to the request for playback, the server returns a response message including only a total size of the "XX" MP4 file to the smart phone;

4) the smart phone computes a header data range and a trailer data range based on a preset proportion and the total size;

5) the smart phone sends an acquiring request for partial data in the header data range of the "XX" MP4 file through an HTTP-RANGE instruction;

6) the server returns corresponding header data to the smart phone in response to the acquiring request;

7) the smart phone does not find MOOV data in the header data;

8) the smart phone sends an acquiring request for partial data in the trailer data range of the "XX" MP4 file through an HTTP-RANGE instruction;

9) the server returns corresponding trailer data to the smart phone in response to the acquiring request; and 10) the smart phone finds the MOOV data in the trailer data, acquires a corresponding segment of the MP4 file based on a playback time point selected by the user, and realizes the normal playback of the corresponding segment of the MP4 file with the help of media playback instruction information in the MOOV.

Figure 6:
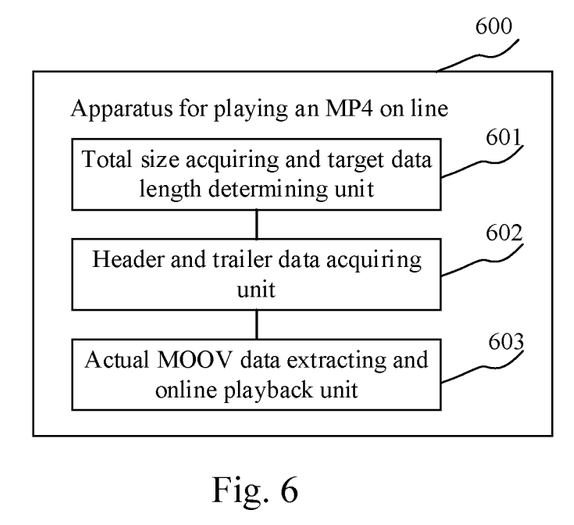
FIG. 6 is a structural block diagram of an apparatus for playing an MP4 online provided in an embodiment of the present disclosure.

Further referring to FIG. 6, as an implementation of the method shown in the above figures, an embodiment of the present disclosure provides an apparatus for playing an MP4 online. The embodiment of the apparatus corresponds to the embodiment of the method shown in FIG. 2, and the apparatus may be specifically applied to various electronic devices.

As shown in FIG. 6, the apparatus 600 for playing an MP4 online in the present embodiment may include: a total size acquiring and target data length determining unit 601, a header and trailer data acquiring unit 602, and an actual MOOV data extracting and online playback unit 603. The total size acquiring and target data length determining unit 601 is configured to acquire a total size of a target MP4 file, and determine a target data length based on the total size and a preset proportion, where the preset proportion is determined based on a proportion of MOOV data to a complete MP4 file; the header and trailer data acquiring unit 602 is configured to acquire header data having the target data length from a header of the target MP4 file, and acquire trailer data having the target data length from a trailer of the target MP4 file; and the actual MOOV data extracting and online playback unit 603 is configured to play the target MP4 file online based on actual MOOV data extracted from the header data or the trailer data.

In the present embodiment, the specific processing of the total size acquiring and target data length determining unit 601, the header and trailer data acquiring unit 602, and the actual MOOV data extracting and online playback unit 603 of the apparatus 600 for playing an MP4 online in the present embodiment and the technical effects thereof may be described with reference to the relevant description of step 201 to step 203 in the corresponding embodiment of FIG. 2, respectively, and are not repeated here.

In some alternative implementations of the present embodiment, the total size acquiring and target data length determining unit 601 includes a total size acquiring subunit configured to acquire the total size of the target MP4 file. The total size acquiring subunit may be further configured to:

initiate an online playback request for the target MP4 file;

receive an HTTP response message for the online playback request; and extract the total size of the target MP4 file from an HTTP-header of the HTTP response message.

In some alternative implementations of the present embodiment, the apparatus 600 for playing an MP4 online may further include a preset proportion determining unit configured to determine the preset proportion based on the proportion of the MOOV data to the complete MP4 file. The preset proportion determining unit may further include:

a sample file set acquiring subunit configured to acquire a sample MP4 file set;

a proportion upper limit statistics subunit configured to perform statistics on an upper limit of a proportion of MOOV data to a complete MP4 file in each sample MP4 file of the sample MP4 file set; and a correcting subunit configured to correct a value of the upper limit of the proportion in accordance with a preset proportion correcting approach, and determine the corrected upper limit of the proportion as the preset proportion.

In some alternative implementations of the present embodiment, the correcting subunit may be further configured to:

correct the value of the upper limit of the proportion based on an idle network bandwidth in an environment; where a size of the idle network bandwidth is directly proportional to an increased value of the upper limit of the proportion.

In some alternative implementations of the present embodiment, the correcting subunit may be further configured to:

correct the value of the upper limit of the proportion based on a device type of a present device; where the device type includes a wired communication device and a wireless communication device, and an increased value corresponding to the wired communication device is greater than an increased value corresponding to the wireless communication device.

In some alternative implementations of the present embodiment, the correcting subunit may be further configured to:

perform statistics to obtain an average size of the sample MP4 files in the sample MP4 file set;

calculate a size difference between a total size of the target MP4 file and the average size; and determine, in response to the size difference indicating that the total size is greater than the average size, a decreased value of the upper limit of the proportion based on a size of the size difference.

In some alternative implementations of the present embodiment, the header and trailer data acquiring unit 602 may be further configured to:

determine a header data range having a length equal to the target data length from a header of the target MP4 file;

determine a trailer data range having a length equal to the target data length from a trailer of the target MP4 file;

initiate an HTTP-RANGE request including the header data range and the trailer data range; and receive returned header data corresponding to the header data range and trailer data corresponding to the trailer data range.

The present embodiment serves as an embodiment of the apparatus corresponding to the above embodiment of the method. The apparatus for playing an MP4 online provided in the present embodiment determines a preset proportion based on a usual proportion of MOOV data to a complete MP4 file, and targetedly extracts a portion of data having a corresponding data length from a header of a target MP4 file and extracts a portion of data having the corresponding data length from a trailer of the target MP4, thereby quickly starting to play the target MP4 file online without acquiring complete data of the target MP4, even if MOOV data of the target MP4 file is located behind the MDAT data.

According to an embodiment of the present disclosure, the present disclosure further provides an electronic device, including: at least one processor; and a memory communicatively connected to the at least one processor; where the memory stores instructions executable by the at least one processor, and the instructions are executed by the at least one processor, such that the at least one processor implements the method for playing an MP4 online according to any of the above embodiments.

According to an embodiment of the present disclosure, the present disclosure further provides a readable storage medium storing computer instructions, where the computer instructions are used for causing a computer to implement the method for playing an MP4 online according to any of the above embodiments.

An embodiment of the present disclosure provides a computer program product, where the computer program, when executed by a processor, implements the method for playing an MP4 online according to any of the above embodiments.

Figure 7:
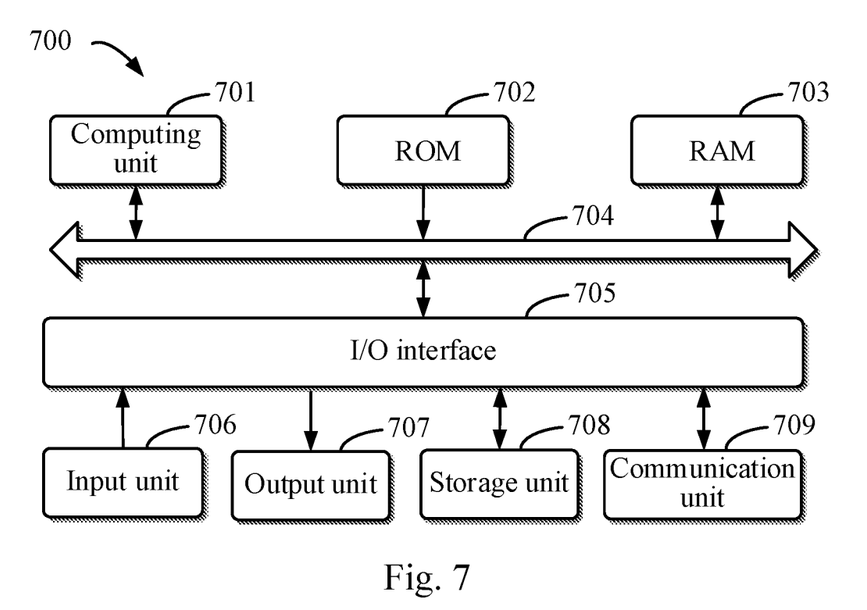
FIG. 7 is a schematic structural diagram of an electronic device adapted to executing the method for playing an MP4 online provided in embodiments of the present disclosure.

FIG. 7 shows a schematic block diagram of an example electronic device 700 that may be configured to implement embodiments of the present disclosure. The electronic device is intended to represent various forms of digital computers, such as a laptop computer, a desktop computer, a workbench, a personal digital assistant, a server, a blade server, a mainframe computer, and other suitable computers. The electronic device may alternatively represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 7, the device 700 includes a computing unit 701, which may execute various appropriate actions and processes in accordance with a computer program stored in a read-only memory (ROM) 702 or a computer program loaded into a random access memory (RAM) 703 from a storage unit 708. The RAM 703 may further store various programs and data required by operations of the device 700. The computing unit 701, the ROM 702, and the RAM 703 are connected to each other through a bus 704. An input/output (I/O) interface 705 is also connected to the bus 704.

A plurality of components in the device 700 is connected to the I/O interface 705, including: an input unit 706, such as a keyboard and a mouse; an output unit 707, such as various types of displays and speakers; a storage unit 708, such as a magnetic disk and an optical disk; and a communication unit 709, such as a network card, a modem, and a wireless communication transceiver. The communication unit 709 allows the device 700 to exchange information/data with other devices through a computer network such as the Internet and/or various telecommunication networks.

The computing unit 701 may be various general purpose and/or specific purpose processing components having a processing capability and a computing capability. Some examples of the computing unit 701 include, but are not limited to, a central processing unit (CPU), a graphics processing unit (GPU), various specific purpose artificial intelligence (AI) computing chips, various computing units running a machine learning model algorithm, a digital signal processor (DSP), and any appropriate processor, controller, micro-controller, and the like. The computing unit 701 executes various methods and processes described above, such as the method for playing an MP4 online. For example, in some embodiments, the method for playing an MP4 online may be implemented as a computer software program that is tangibly included in a machine readable medium, such as the storage unit 708. In some embodiments, some or all of the computer programs may be loaded and/or installed onto the device 700 via the ROM 702 and/or the communication unit 709. When the computer program is loaded into the RAM 703 and executed by the computing unit 701, one or more steps of the method for playing an MP4 online described above may be executed. Alternatively, in other embodiments, the computing unit 701 may be configured to execute the method for playing an MP4 online by any other appropriate approach (e.g., by means of firmware).

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input apparatus and at least one output apparatus, and send the data and instructions to the storage system, the at least one input apparatus and the at least one output apparatus.

Program codes for implementing the method of the present disclosure may be compiled using any combination of one or more programming languages. The program codes may be provided to a processor or controller of a general purpose computer, a specific purpose computer, or other programmable apparatuses for data processing, such that the program codes, when executed by the processor or controller, cause the functions/operations specified in the flowcharts and/or block diagrams to be implemented. The program codes may be completely executed on a machine, partially executed on a machine, partially executed on a machine and partially executed on a remote machine as a separate software package, or completely executed on a remote machine or server.

In the context of the present disclosure, the machine readable medium may be a tangible medium which may contain or store a program for use by, or used in combination with, an instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include an electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or tactile feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server may be a cloud server, which is also known as a cloud computing server or a cloud host, and is a host product in a cloud computing service system to solve the defects of difficult management and weak service extendibility existing in conventional physical hosts and virtual private servers (VPS).

The technical solutions according to embodiments of the present disclosure determine a preset proportion based on a usual proportion of MOOV data to a complete MP4 file, and targetedly extract a portion of data having a corresponding data length from a header of a target MP4 file and extracts a portion of data having the corresponding data length from a trailer of the target MP4, thereby quickly starting to play the target MP4 file online without acquiring complete data of the target MP4, even if MOOV data of the target MP4 file is located behind the MDAT data.

It should be understood that the various forms of processes shown above may be used to reorder, add, or delete steps. For example, the steps disclosed in the present disclosure may be executed in parallel, sequentially, or in different orders, as long as the desired results of the technical solutions disclosed in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for playing an MP4 online, comprising:
   acquiring a total size of a target MP4 file, and determining a target data length based on the total size and a preset proportion, wherein the preset proportion is determined based on a proportion of MOOV data to a complete MP4 file at least by:
   acquiring a sample MP4 file set,
      by performing statistics on an upper limit of a proportion of MOOV data to a complete MP4 file in each sample MP4 file of the sample MP4 file set and
      by correcting a value of the upper limit of the proportion in accordance with a preset proportion correcting approach, and determining the corrected upper limit of the proportion as the preset proportion;
   acquiring header data having the target data length from a header of the target MP4 file, and acquiring trailer data having the target data length from a trailer of the target MP4 file; and
   playing the target MP4 file online based on actual MOOV data extracted from the header data or the trailer data.

2. The method according to claim 1, wherein the acquiring the total size of the target MP4 file comprises:
   initiating an online playback request for the target MP4 file;
   receiving an HTTP response message for the online playback request; and
   extracting the total size of the target MP4 file from an HTTP-header of the HTTP response message.

3. The method according to claim 1, wherein the correcting the value of the upper limit of the proportion in accordance with the preset proportion correcting approach comprises:
   correcting the value of the upper limit of the proportion based on an idle network bandwidth in an environment; wherein a size of the idle network bandwidth is directly proportional to an increased value of the upper limit of the proportion.

4. The method according to claim 1, wherein the correcting the value of the upper limit of the proportion in accordance with the preset proportion correcting approach comprises:
   correcting the value of the upper limit of the proportion based on a device type of a present device; wherein the device type comprises a wired communication device and a wireless communication device, and an increased value corresponding to the wired communication device is greater than an increase value corresponding to the wireless communication device.

5. The method according to claim 1, wherein the correcting the value of the upper limit of the proportion in accordance with the preset proportion correcting approach comprises:
   performing statistics to obtain an average size of the sample MP4 files in the sample MP4 file set;
   calculating a size difference between the total size of the target MP4 file and the average size; and
   determining, in response to the size difference indicating that the total size is greater than the average size, a decreased value of the upper limit of the proportion based on a size of the size difference.

6. The method according to claim 1, wherein the acquiring the header data having the target data length from a header of the target MP4 file, and acquiring the trailer data having the target data length from the trailer of the target MP4 file comprises:
   determining a header data range having a length equal to the target data length from the header of the target MP4 file;
   determining a trailer data range having a length equal to the target data length from the trailer of the target MP4 file;
   initiating an HTTP-RANGE request comprising the header data range and the trailer data range; and
   receiving returned header data corresponding to the header data range and trailer data corresponding to the trailer data range.

7. The method according to claim 1, wherein the acquiring the header data having the target data length from a header of the target MP4 file, and acquiring the trailer data having the target data length from the trailer of the target MP4 file comprises:
   determining a header data range having a length equal to the target data length from the header of the target MP4 file;
   determining a trailer data range having a length equal to the target data length from the trailer of the target MP4 file;
   initiating an HTTP-RANGE request comprising the header data range and the trailer data range; and receiving returned header data corresponding to the header data range and trailer data corresponding to the trailer data range.

8. The method according to claim 2, wherein the acquiring the header data having the target data length from a header of the target MP4 file, and acquiring the trailer data having the target data length from the trailer of the target MP4 file comprises:
  determining a header data range having a length equal to the target data length from the header of the target MP4 file;
  determining a trailer data range having a length equal to the target data length from the trailer of the target MP4 file;
  initiating an HTTP-RANGE request comprising the header data range and the trailer data range; and
  receiving returned header data corresponding to the header data range and trailer data corresponding to the trailer data range.

9. The method according to claim 3, wherein the acquiring the header data having the target data length from a header of the target MP4 file, and acquiring the trailer data having the target data length from the trailer of the target MP4 file comprises:
  determining a header data range having a length equal to the target data length from the header of the target MP4 file;
  determining a trailer data range having a length equal to the target data length from the trailer of the target MP4 file;
  initiating an HTTP-RANGE request comprising the header data range and the trailer data range; and
  receiving returned header data corresponding to the header data range and trailer data corresponding to the trailer data range.

10. The method according to claim 4, wherein the acquiring the header data having the target data length from a header of the target MP4 file, and acquiring the trailer data having the target data length from the trailer of the target MP4 file comprises:
  determining a header data range having a length equal to the target data length from the header of the target MP4 file;
  determining a trailer data range having a length equal to the target data length from the trailer of the target MP4 file;
  initiating an HTTP-RANGE request comprising the header data range and the trailer data range; and
  receiving returned header data corresponding to the header data range and trailer data corresponding to the trailer data range.

11. The method according to claim 5, wherein the acquiring the header data having the target data length from a header of the target MP4 file, and acquiring the trailer data having the target data length from the trailer of the target MP4 file comprises:
  determining a header data range having a length equal to the target data length from the header of the target MP4 file;
  determining a trailer data range having a length equal to the target data length from the trailer of the target MP4 file;
  initiating an HTTP-RANGE request comprising the header data range and the trailer data range; and
  receiving returned header data corresponding to the header data range and trailer data corresponding to the trailer data range.

12. An electronic device, comprising:
  at least one processor; and
  a memory communicatively connected to the at least one processor; wherein
  the memory stores instructions executable by the at least one processor, and the instructions, when executed by the at least one processor, cause the at least one processor to perform operations comprising:
  acquiring a total size of a target MP4 file, and determining a target data length based on the total size and a preset proportion, wherein the preset proportion is determined based on a proportion of MOOV data to a complete MP4 file at least by:
    acquiring a sample MP4 file set,
    by performing statistics on an upper limit of a proportion of MOOV data to a complete MP4 file in each sample MP4 file of the sample MP4 file set and
    by correcting a value of the upper limit of the proportion in accordance with a preset proportion correcting approach, and determining the corrected upper limit of the proportion as the preset proportion;
  acquiring header data having the target data length from a header of the target MP4 file, and acquiring trailer data having the target data length from a trailer of the target MP4 file; and
  playing the target MP4 file online based on actual MOOV data extracted from the header data or the trailer data.

13. The electronic device according to claim 12, wherein the acquiring the total size of the target MP4 file comprises:
  initiating an online playback request for the target MP4 file;
  receiving an HTTP response message for the online playback request; and
  extracting the total size of the target MP4 file from an HTTP-header of the HTTP response message.

14. The electronic device according to claim 12, wherein the correcting the value of the upper limit of the proportion in accordance with the preset proportion correcting approach comprises:
  correcting the value of the upper limit of the proportion based on an idle network bandwidth in an environment; wherein a size of the idle network bandwidth is directly proportional to an increased value of the upper limit of the proportion.

15. The electronic device according to claim 12, wherein the correcting the value of the upper limit of the proportion in accordance with the preset proportion correcting approach comprises:
  correcting the value of the upper limit of the proportion based on a device type of a present device; wherein the device type comprises a wired communication device and a wireless communication device, and an increased value corresponding to the wired communication device is greater than an increase value corresponding to the wireless communication device.

16. The electronic device according to claim 12, wherein the correcting the value of the upper limit of the proportion in accordance with the preset proportion correcting approach comprises:
  performing statistics to obtain an average size of the sample MP4 files in the sample MP4 file set;
  calculating a size difference between the total size of the target MP4 file and the average size; and
  determining, in response to the size difference indicating that the total size is greater than the average size, a decreased value of the upper limit of the proportion based on a size of the size difference.

17. The electronic device according to claim 12, wherein the acquiring the header data having the target data length from a header of the target MP4 file, and acquiring the trailer data having the target data length from the trailer of the target MP4 file comprises:
- determining a header data range having a length equal to the target data length from the header of the target MP4 file;
- determining a trailer data range having a length equal to the target data length from the trailer of the target MP4 file;
- initiating an HTTP-RANGE request comprising the header data range and the trailer data range; and
- receiving returned header data corresponding to the header data range and trailer data corresponding to the trailer data range.

18. A non-transitory computer-readable storage medium storing computer instructions, wherein the computer instructions are used for causing a computer to perform operations comprising:
- acquiring a total size of a target MP4 file, and determining a target data length based on the total size and a preset proportion, wherein the preset proportion is determined based on a proportion of MOOV data to a complete MP4 file at least by:
  - acquiring a sample MP4 file set;
  - by performing statistics on an upper limit of a proportion of MOOV data to a complete MP4 file in each sample MP4 file of the sample MP4 file set; and
  - by correcting a value of the upper limit of the proportion in accordance with a preset proportion correcting approach, and determining the corrected upper limit of the proportion as the preset proportion;
- acquiring header data having the target data length from a header of the target MP4 file, and acquiring trailer data having the target data length from a trailer of the target MP4 file; and
- playing the target MP4 file online based on actual MOOV data extracted from the header data or the trailer data.

* * * * *